(12) United States Patent
Moquin

(10) Patent No.: US 6,834,966 B1
(45) Date of Patent: Dec. 28, 2004

(54) PASSAGEWAY WITH VIRTUAL REALITY ENVIRONMENT

(76) Inventor: Carole Moquin, 12, Marie-Victorin, Candiac, Quebec (CA), J5R 1B4

( * ) Notice: Subject to any disclaimer, the term of this patent is extended or adjusted under 35 U.S.C. 154(b) by 24 days.

(21) Appl. No.: 10/463,420

(22) Filed: Jun. 18, 2003

(51) Int. Cl.$^7$ .............................................. G03B 21/14
(52) U.S. Cl. .............................. 353/94; 353/28; 472/60
(58) Field of Search ........................... 353/28, 94, 122; 434/67, 69, 70; 352/69, 70, 133; 472/48, 59, 60

(56) References Cited

U.S. PATENT DOCUMENTS

| | | | | |
|---|---|---|---|---|
| 917,587 | A | * 4/1909 | Good | .......................... 352/100 |
| 3,107,577 | A | * 10/1963 | Adams | .......................... 352/70 |
| 3,743,394 | A | * 7/1973 | Meszlenyi | ................... 352/100 |
| 4,630,908 | A | * 12/1986 | Tremblay | .................... 353/94 |
| 4,962,420 | A | 10/1990 | Judenich | |
| 5,580,140 | A | * 12/1996 | Katz et al. | ..................... 353/13 |
| 5,655,909 | A | * 8/1997 | Kitchen et al. | ............... 434/44 |
| 5,860,811 | A | 1/1999 | Henderson | |
| 6,353,468 | B1 | * 3/2002 | Howard et al. | ............. 352/100 |
| 6,428,449 | B1 | 8/2002 | Apseloff | |

FOREIGN PATENT DOCUMENTS

WO    WO 03/041038 A1    5/2003

OTHER PUBLICATIONS

Makal, K., "ZONA Design Crafts Chrysler Video Wall Presentation", Apr. 1, 2003, www.uemedia.com.

* cited by examiner

*Primary Examiner*—William C. Dowling
(74) *Attorney, Agent, or Firm*—Ogilvy Renault; Robert Mitchell

(57) ABSTRACT

The invention relates to a passageway having a virtual reality environment through which person can travel. The passageway according to the invention has an elongated pathway with curved sections and opposed sidewalls, the sidewalls being formed of a material adapted to receive a projected image, and image-projectors associated with specific portions of each sidewall for projecting a different image on each sidewall portion. The images projected on adjacent portions form a continuous panorama from an entrance end of the passageway to an exit end thereof. At least sections of the images are visible to a person travelling through the passageway when looking forward along a longitudinal axis of the pathway. Persons travelling through the passageway on foot or roller-blades or by bicycle can benefit from exercise while enjoying a scenic panorama, in a virtual reality environment.

16 Claims, 2 Drawing Sheets

PASSAGEWAY WITH VIRTUAL REALITY ENVIRONMENT

BACKGROUND OF THE INVENTION

The present invention pertains to improvements in the field of entertainment. More particularly, the invention is directed to a passageway having a virtual reality environment through which a person can travel.

U.S. Pat. No. 4,630,908 discloses a tunnel structure capable of accommodating a number of persons in an audio-visual environment. The tunnel structure includes a main cylindrical corridor and a conveyor-bet-driven bottom floor for transporting the persons from one end of the corridor to an opposite end. The main corridor comprises an inner wall being almost totally constituted by a plurality of adjacent image-producing screens, of translucent nature. The main corridor may be closed at each end thereof by extendable doors. The doors and the walls of the corridor comprise therewithin cameras which project images onto the inner side of the screens.

Although the above tunnel structure is capable of producing a total audio-visual environment, it is capable of doing so only when the doors are closed, thus restricting the number of persons travelling through such a tunnel structure. Moreover, the latter does not allow the persons travelling therethrough to benefit from exercise.

SUMMARY OF THE INVENTION

It is therefor an object of the present invention to overcome the above drawbacks and to provide a passageway capable of providing a virtual reality environment, regardless of the number of persons travelling therethrough, and enabling such persons to benefit from exercise while enjoying a scenic panorama.

In accordance with the invention, there is provided a passageway having a virtual reality environment through which a person can travel. The passageway of the invention has an elongated pathway with curved sections and opposed sidewalls, the sidewalls being formed of a material adapted to receive a projected image, and projection means associated with specific portions of each sidewall for projecting a different image on each sidewall portion. The images projected on adjacent portions of each sidewall form a continuous panorama from an entrance end of the passageway to an exit end thereof. At least sections of the images are being visible to a person travelling through the passageway when looking forward along a longitudinal axis of the pathway.

According to a preferred embodiment of the invention, the sidewalls each have an inner surface facing the pathway and an outer surface adapted to receive the projected images such that these images are visible from the inner surface. Preferably, the sidewalls are formed of a translucent screen material.

In a particularly preferred embodiment, the sidewalls define first and second inner sidewalls, and first and second outer sidewalls are disposed in spaced-apart relation to the first and second inner sidewalls, respectively. The projection means comprise a first series of independent image-projectors mounted on the first outer sidewall between the first inner sidewall and the first outer sidewall, and a second series of independent image-projectors mounted on the second outer sidewall between the second inner sidewall and the second outer sidewall.

According to another preferred embodiment, the passageway further includes a topwall formed of the aforesaid material and further projection means associated with specific portions of the topwall for projecting a different image on each portion of the topwall. The images projected on adjacent portions of the topwall form another continuous panorama from the entrance end of the passageway to the exit end thereof. Preferably, the topwall has an inner surface facing the pathway and an outer surface adapted to receive the images projected by the further projection means such that these images are visible from the inner surface of the topwall.

In a particularly preferred embodiment, the topwall defines an inner topwall and an outer topwall is disposed in spaced-apart relation to the inner topwall. The further projection means comprise a third series of independent image-projectors mounted on the outer topwall between the inner topwall and the outer topwall.

Persons travelling through the above passageway on foot or roller-blades or by bicycle can benefit from exercise while enjoying a scenic panorama, in a virtual reality environment.

BRIEF DESCRIPTION OF THE DRAWINGS

Further features and advantages of the invention will become more readily apparent from the following description of preferred embodiments illustrated by way of examples in the accompanying drawings, in which.

DETAILED DESCRIPTION OF PREFERRED EMBODIMENTS

Figure 1:
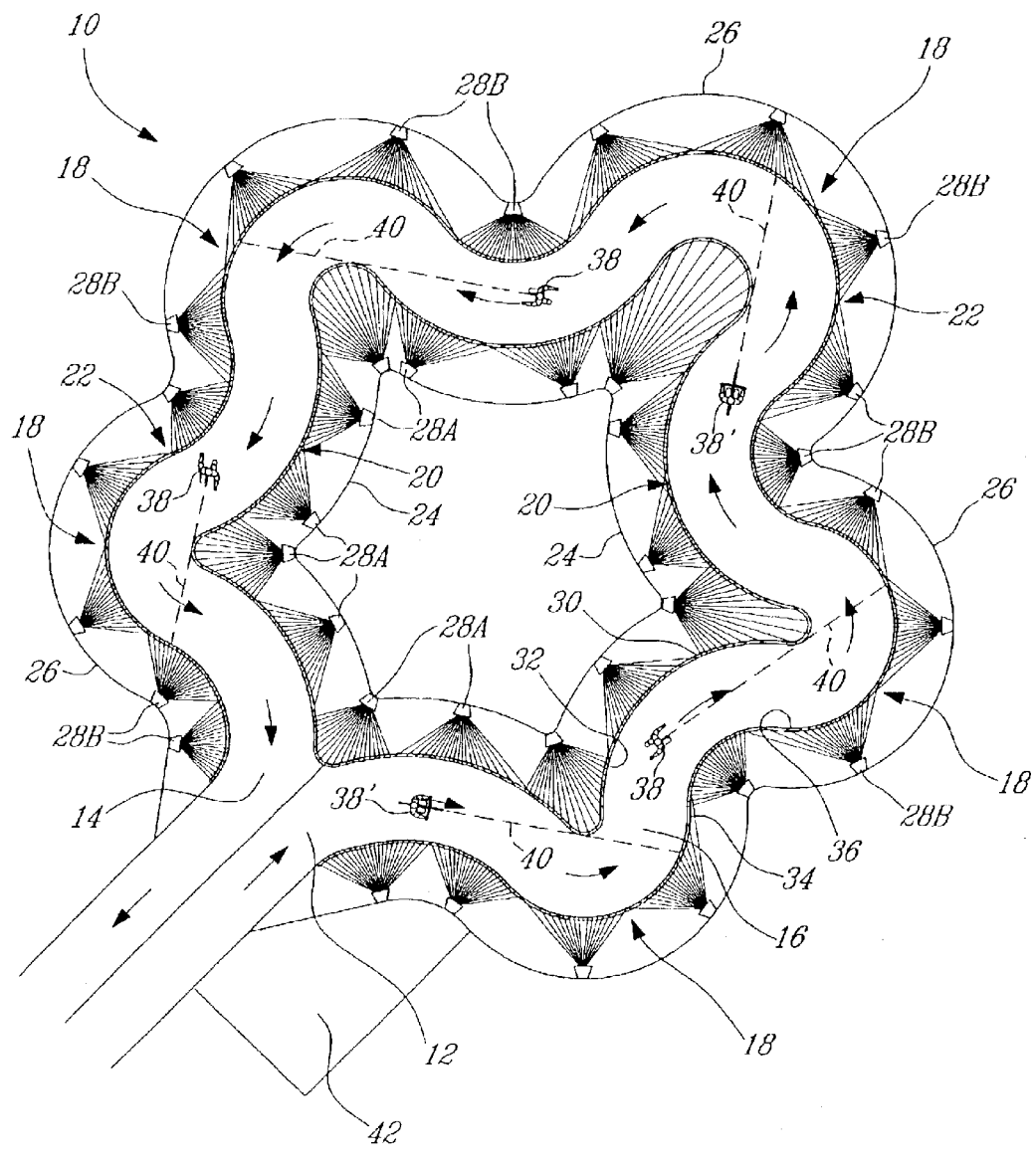
FIG. 1 is a schematic top view of a passageway according to a preferred embodiment of the invention.

Referring first to FIG. 1, there is illustrated a passageway 10 having an entrance end 12 and an exit end 14 adjacent to the entrance end 12, and an elongated pathway 16 with curved sections 18. The passageway 10 further has inner sidewalls 20, 22 formed of a translucent screen material and outer sidewalls 24, 26 disposed in spaced-apart relation to the inner sidewalls 20 and 22, respectively. A first series of independent projectors 28A mounted on the sidewall 24 are adapted to project different images on specific portions of the sidewall 20, the projectors 28A projecting the images on the outer surface 30 of the sidewall 20 such that these images are visible from the inner surface 32 of the sidewall 20. A second series of independent projectors 28B mounted on the sidewall 26 are adapted to project different images on specific portions of the sidewall 22, the projectors 28B projecting the images on the outer surface 34 of the sidewall 22 such that these images are visible from the inner surface 36 of the sidewall 22. The images projected on adjacent portions of each sidewall 20, 22 form a continuous panorama from the entrance end 12 to the exit end 14 of the passageway 10. At least sections of the images are visible by persons 38 and 38' travelling through the passageway 10 when looking forward along a longitudinal axis 40 of the pathway 16. The persons can travel through the passageway 10 on foot or roller-blades, such as the persons 38, or by bicycle, such as the persons 38', and can thus benefit from exercise while enjoying a scenic panorama, in a virtual reality environment. A rental booth 42 is provided adjacent the entrance end 12 for renting helmets, roller-blades and bicycles.

Figure 2:
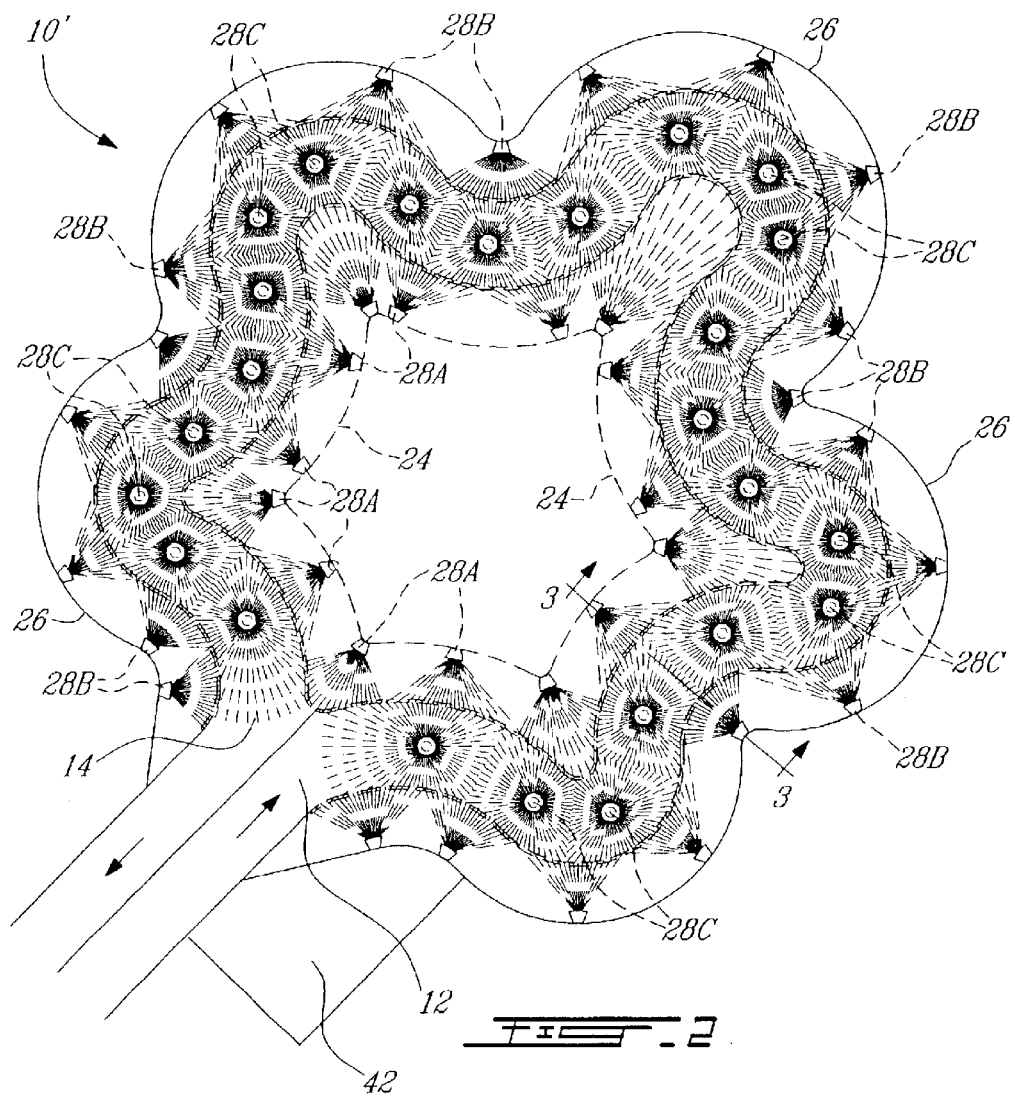
FIG. 2 is a schematic top view of a passageway according to another preferred embodiment of the invention.
Figure 3:
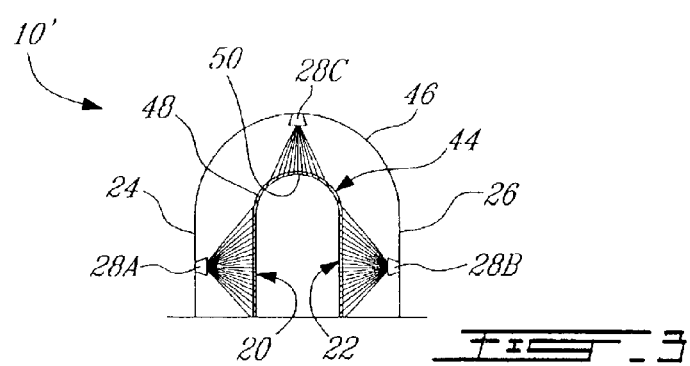
FIG. 3 is a sectional view taken along line 3—3 of FIG. 2.

FIGS. 2 and 3 illustrate a passageway 10' similar to the passageway 10 shown in FIG. 1, with the exception that the passageway 10' has an inner topwall 44 formed of a translucent screen material and an outer topwall 46 disposed in spaced-apart relation to the topwall 44. A third series of independent projectors 28C mounted on the topwall 46 are adapted to project different images on specific portions of the topwall 44, the projectors 28C projecting the images on the outer surface 48 of the topwall 44 such that these images are visible from the inner surface 50 of the topwall 44. The images projected on adjacent portions of the topwall 44 form another continuous panorama from the entrance end 12 to the exit end of the passageway 10'.

I claim:

1. A passageway having a virtual reality environment through which a person can travel, said passageway being bounded by walls with curved sections all along said passageway to define a curved travelling path, said walls being formed of a material adapted to receive a projected image, and projection means associated with specific portions of each said wall for projecting a different image on each said portion, the images projected on adjacent portions of each said sidewall forming a continuous panorama from an entrance end of the passageway to an exit end thereof, at least sections of the images on the walls merging with each other along said curved sections being visible to a person travelling through the passageway.

2. A passageway as claimed in claim 1, wherein said sidewalls each have an inner surface and an outer surface adapted to receive the projected images such that said images are visible from said inner surface.

3. A passageway as claimed in claim 2, wherein said material comprises a translucent screen material.

4. A passageway as claimed in claim 2, wherein said walls define first and second inner sidewalls and wherein first and second outer sidewalls are disposed in spaced-apart relation to said first and second inner sidewalls, respectively, said projection means comprising a first series of independent image-projectors mounted on said first outer sidewall between said first inner sidewall and said first outer sidewall, and a second series of independent image-projectors mounted on said second outer sidewall between said second inner sidewall and said second outer sidewall.

5. A passageway as claimed in claim 1, further including a topwall formed of said material and further projection means associated with specific portions of said topwall for projecting a different image on each said portion of said topwall, the images projected on adjacent portions of said topwall forming another continuous panorama from the entrance end of the passageway to the exit end thereof.

6. A passageways as claimed in claim 5, wherein said topwall has an inner surface and an outer surface adapted to receive the images projected by said filter projection means such that said images are visible from the inner surface of said topwall.

7. A passageway as claimed in claim 6, wherein said material comprises a translucent screen material.

8. A passageway as claimed in claim 6, wherein said topwall defines an inner topwall and wherein an outer topwall is disposed in spaced-apart relation to said inner topwall, said projection means comprising a series of independent image-projectors mounted on said outer topwall between said inner topwall and said outer topwall.

9. A passageway as claimed in claim 4, further including a topwall formed of said material and further projection means associated with specific portions of said topwall for projecting a different image on each said portion of said topwall, the images projected on adjacent portions of said topwall forming another continuous panorama from the entrance end of the passageway to the exit end thereof.

10. A passageway as claimed in claim 9, wherein said topwall has an inner surface and an outer surface adapted to receive the images projected by said further projection means such that said images are visible from the inner surface of said topwall.

11. A passageway as claimed in claim 10, wherein said topwall defines an inner topwall and wherein an outer topwall is disposed in spaced-apart relation to said inner topwall, said further projection means comprising a third series of independent image-projectors mounted on said outer topwall between said inner topwall and said outer topwall.

12. A passageway as claimed in claim 1, wherein said entrance end and said exit end are adjacent to one another.

13. A passageway as claimed in claim 1, adapted to receive a person travelling therethrough on foot.

14. A passageway as claimed in claim 1, adapted to receive a person travelling therethrough on roller-blades.

15. A passageway as claimed in claim 1, adapted to receive a person travelling therethrough by bicycle.

16. A passageway having a virtual reality environment through which a person can travel, said passageway being bounded by walls with curved sections all along said passageway to define a curved travelling path, said walls being formed of a material adapted to receive a projected image, and projection means associated with specific portions of each said wall for projecting a different image on each said portion, the images projected on adjacent portions of each said sidewall forming a continuous panorama from an entrance end of the passageway to an exit end thereof, at least sections of the images on the walls being visible to a person travelling through the passageway, wherein said entrance end and said exit end are adjacent to one another.

* * * * *